United States Patent
Goire et al.

(10) Patent No.: US 6,983,460 B1
(45) Date of Patent: Jan. 3, 2006

(54) METHOD FOR LOADING APPLICATIONS INTO A MULTIAPPLICATION EMBEDDED SYSTEM EQUIPPED WITH DATA PROCESSING RESOURCES, CORRESPONDING EMBEDDED SYSTEM AND EXECUTION METHOD

(75) Inventors: Christian Goire, Les Clayes Sous Bois (FR); Jean Paul Billon, San Francisco-Etats-Unis (FR)

(73) Assignee: CP8 Technologies, Paris (FR)

( * ) Notice: Subject to any disclaimer, the term of this patent is extended or adjusted under 35 U.S.C. 154(b) by 627 days.

(21) Appl. No.: 09/889,416

(22) PCT Filed: Nov. 17, 2000

(86) PCT No.: PCT/FR00/03193

§ 371 (c)(1),
(2), (4) Date: Jul. 17, 2001

(87) PCT Pub. No.: WO01/37085

PCT Pub. Date: May 25, 2001

(30) Foreign Application Priority Data

Nov. 17, 1999 (FR) ................................. 99 14454

(51) Int. Cl.
*G06F 9/445* (2006.01)
(52) U.S. Cl. ...................................... 717/175; 719/328
(58) Field of Classification Search ............... 717/162, 717/168–178; 719/328
See application file for complete search history.

(56) References Cited

U.S. PATENT DOCUMENTS 6,308,317 B1 * 10/2001 Wilkinson et al. .......... 717/139
6,363,436 B1 * 3/2002 Hagy et al. ................. 719/331
6,430,570 B1 * 8/2002 Judge et al. ............ 707/103 R

FOREIGN PATENT DOCUMENTS

FR 2 673 476 9/1992
WO WO 98 19237 A 7/1998

OTHER PUBLICATIONS

Shiqun Chen, Rinaldo Di Giorgio, "Understanding Java Card 2.0" Internet Document, Mar. 1998, XPOO2146332.

\* cited by examiner

*Primary Examiner*—Kakali Chaki
*Assistant Examiner*—Lawrence Shrader
(74) *Attorney, Agent, or Firm*—Miles & Stockbridge P.C.; Edward J. Kondracki (57) ABSTRACT

A method for loading applications into an embedded system from a station on which the source code of the application is written, compiled, verified and converted. The conversion includes the performance of the static linking of a plurality of sets of packages, called modules, and an application program interface module or a service module corresponding to an application, and consists of assigning an identifier to each module and a reference number to each class, each method and each attribute. The reference to a method or an attribute in the linked pseudocode of a module is coded in three bytes referencing a class internal or external to the module, the number of the class, and either the number of the method or the number of the attribute, a reference to an external class being interpreted as a reference to an API module.

15 Claims, 4 Drawing Sheets

METHOD FOR LOADING APPLICATIONS INTO A MULTIAPPLICATION EMBEDDED SYSTEM EQUIPPED WITH DATA PROCESSING RESOURCES, CORRESPONDING EMBEDDED SYSTEM AND EXECUTION METHOD

FIELD OF THE INVENTION

The present invention concerns a method for loading applications into a multi-application embedded system equipped with data processing resources, the corresponding embedded system, and the method for executing an application of a corresponding embedded system.

The present invention more specifically concerns the creation of a firewall between modules sharing the same memory space in systems embedded in multi-application portable objects using an intermediate pseudocode and an associated virtual machine.

DESCRIPTION OF THE RELATED ART

The "Java" (registered trademark) technology introduced by Sun is based on an object-oriented programming language, "Java," and an associated virtual machine. This technology was developed on stations or PCs, hereinafter referred to as conventional Java platforms, having high CPU power and a large memory on the order of 1 megabyte.

For several years, the concepts of Java technology have been adopted and adapted to run on embedded systems in portable objects, for example in the format of a credit card or a SIM micromodule incorporating a microprocessor and commonly called a smart card, GSM (Global System for Mobile Communication) portable telephones, PCMCIA cards or any other portable terminals. Hereinafter, the term card will be used to designate any of these portable objects. The programming of embedded systems, heretofore performed in an assembly language, is now possible in an advanced language like Java, making it possible to accelerate the development of client applications.

Figure 4A:
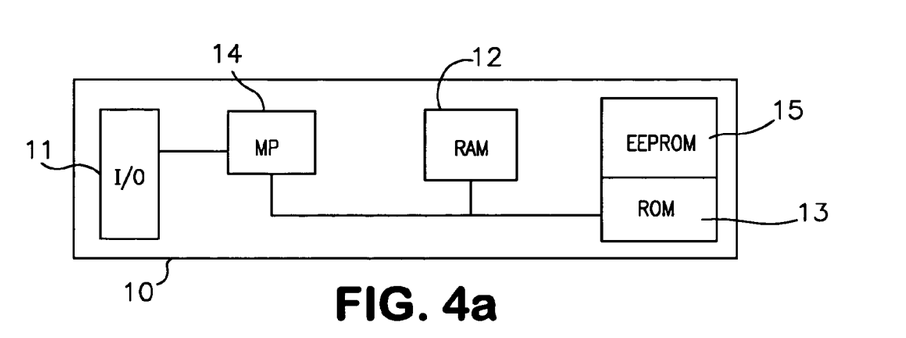
FIG. 4a represents the conventional diagram of a smart card.

This new type of platform specific to the embedded systems of a portable object, hereinafter called a specific platform, constitutes a subsystem of the conventional platform. The differences result from the smaller environment of embedded systems. Conventionally, as represented in FIG. 4a, a smart card (10) comprises an input-output system (11) linked to the microprocessor (14), a volatile RAM (Random Access Memory) (12), a nonvolatile memory constituted by a ROM (Read-Only Memory) and a programmable nonvolatile memory (15) constituted by a flash RAM or EEPROM (Electrically Erasable Programmable Read-Only Memory). All of these elements are linked to the microprocessor by a link bus. For example, in the best of cases using the newest currently existing components, a smart card comprises a ROM a 32-kilobyte EEPROM, and a 2-kilobyte RAM.

In a conventional Java system, an application is written on a station or PC. Its source code is complied into an intermediate pseudocode called "Java Byte Code" or byte code, which is independent of the machine code of the platform used. The application is then downloaded into the target platform or conventional Java platform. The loaded application, constituted by a set of classes called client classes, whose methods have been compiled into the pseudocode, is based on application program interfaces or APIs. Application program interfaces make it possible to standardize the user interface, to control an editor, a keyboard or a printer, for example. The virtual machine of a conventional platform comprises a pseudocode verifier, a dynamic class loader, a pseudocode interpreter for translation into machine code, and a security manager.

The main difference between a conventional virtual machine and a virtual machine of an embedded system, called a specific virtual machine, is due to the fact that the virtual machine of an embedded system is broken down into two separate parts. According to FIG. 4b, the virtual machine comprises a part (30) outside the specific platform (40), called an "off-platform" virtual machine, comprising a converter (32) and a part (41) inside the card constituting the specific platform (40), called an "on-platform" virtual machine, which includes the pseudocode interpreter.

Figure 4B:
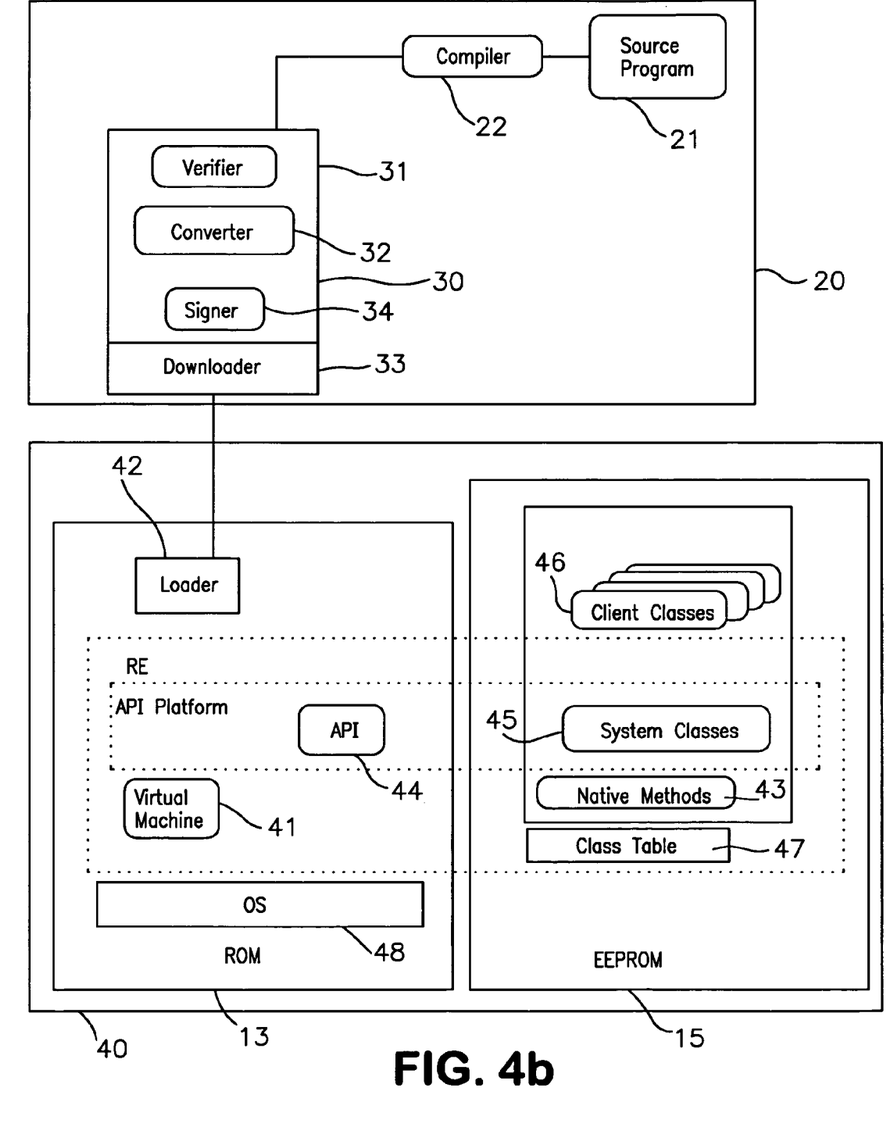
FIG. 4b represents the system required to constitute a virtual machine embedded in a smart card according to the prior art.

Thus, in the case of a specific platform, the source program (21) of the application is written, compiled into intermediate pseudocode by a compiler (22), and verified by an intermediate pseudocode verifier (31) in a conventional station (20), then converted by the converter (32), located in the same station (20) or in another station. After possibly passing through a signer (34), the application is then downloaded into the EEPROM (15) of the portable object or specific platform (40). This loading is performed by a loader comprising an off-platform part called a downloader (33), and an on-platform part called a loader (42). Unlike what exists in a conventional platform for a station, the virtual machine (41) of a specific platform (40), located in ROM with the operating system (48), cannot include an intermediate pseudocode verifier, which is too large to be stored and/or run in the portable object. Nor does the specific platform (40) contain a dynamic class loader. In fact, for the field of application of the invention, in the off-platform virtual machine (30), the verifier (31) verifies that the compiled classes are correctly formed, and verifies the language violations specific to the description of the specific platform. The converter (32) does the work required to load the classes and resolve the references. The converter handles the static linking of the classes, and resolves the symbolic references to the classes, methods and attributes already present in the card. It apportions storage and creates the data structures for representing the classes, creates the static or native methods and attributes, and initializes the static variables.

The runtime environment (or RE) of the specific platform comprises the "on-platform" virtual machine (41), limited to an interpreter, an API platform, and the associated so-called native or static methods (43). The API platform comprises the APIs (Application Program Interfaces) (44) defining a set of classes called system classes (45), and the call conventions by means of which an application accesses the runtime environment (RE) and the static methods (43). The static methods (43) execute the memory allocation, input and output, and cryptographic services of the card.

The interpreter of the "on-platform" virtual machine of the card (41) supports the Java language, and reads the intermediate pseudocode sequentially, instruction by instruction. Each conventional instruction of this intermediate pseudocode is interpreted in the language of the microprocessor by the interpreter, then executed by the microprocessor. As a general rule, the conventional instructions of the intermediate pseudocode make it possible to handle advanced functions such as arithmetic processing and object manipulation. The notion of an object relates to data processing objects such as lists, data arrays or the like. The so-called client classes (46) of the applications and the system classes (45) of the APIs are all loaded into the same memory space and are managed by means of a class table (47).

The virtual machine (41) is also responsible for managing the classes and objects and for maintaining the separations or firewalls between the applications so as to allow secure sharing of the data, also called attributes, variables or fields.

In the case of a portable object like a smart card, an application of a specific platform can be activated directly by the runtime environment (RE) when a selection APDU (Application Protocol Data Unit) sent by a service or terminal is received by the card.

Figure 4C:
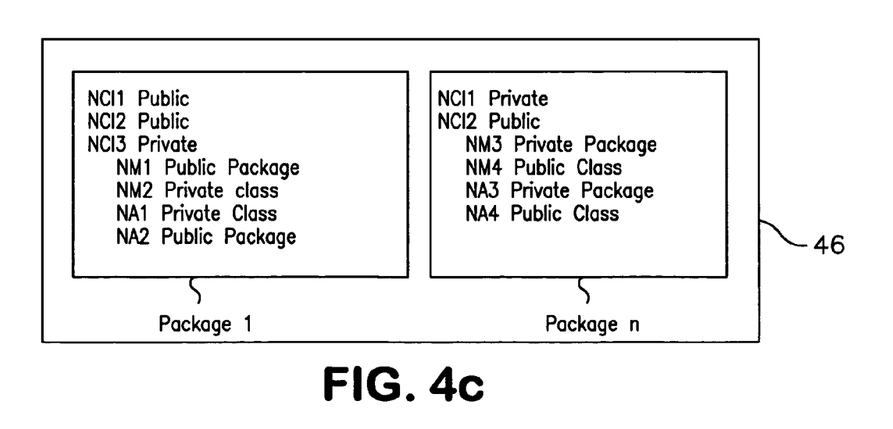
FIG. 4c represents the structure of the classes of an application.

In order to restrict access to the data among the code parts sharing the same memory space, one of the conventional methods in a conventional platform is based on an explicit restriction of visibility declared in the source code. According to FIG. 4c, the methods (NM1, NM2) and (NM3, NM4), respectively, and the attributes (NA1, NA2) and (NA3, NA4), respectively, are encapsulated into classes (NCI3) and (NCI2), respectively, which themselves belong to packages (Package 1) and (Package n), respectively, each of which contains several classes. A class can be public, like (NCI1 or NCI2), or private, like (NCI3), in relation to a package, which in the latter case implies that only the classes of the same package can access this class. The methods (for example NM2) and the data (for example NA1) of one class (NCI3) can be private in relation to the class (NM1, NA1), which is itself private in relation to the package (Package 1), or public in relation to the package (for example NM1, NA2). This restriction of visibility makes it possible to obtain flexible access among the various sets of packages (Package 1, Package n) stored in the same name space, but it has several disadvantages. The conventional or specific platform does not support the notion of sub-packaging well. The client classes of an application of large size must be distributed among various sub-packages, which represent different packages only for the virtual machine. In order for these resources to be shared among these sub-packages, these resources are necessarily declared public, thus rendering them visible to any other package. It is thus difficult to clearly organize the packaging of various applications for applications of large size, and to obtain firewalls between the applications.

In the case of the conventional platform, in a station, the maintenance of the confidentiality of the resources as declared in the source programs is based on dynamic verifications. In order to perform these dynamic verifications, the virtual machine must have all the information relative to the declarations of the access restrictions for each class, method or attribute, which is impossible in the case of the memory space available in the on-platform virtual machine using the pre-linked intermediate pseudocode or byte code of the off-platform virtual machine. In the case of a specific platform of a portable object, the access restrictions can be verified statically during the compilation and can be re-verified by the verifier of the off-platform part. It is essentially assumed that what is loaded into the specific platform of the portable object is correct, since no verification can be performed in the specific platform due to the loss of information during the conversion phase. Moreover, there is no guarantee that a package cannot be extended or modified by new classes coming from alien sources, which can entirely destroy any security based on the utilization of private packages.

The second means provided by the virtual machine of a conventional platform is the notion of name space separation. With the dynamic linking schema of a conventional platform, the classes can be loaded from directories of the local file system called "ClassPath," previously declared as constituting the location of the system classes forming the conventional API platform, or from other directories of the local file system or from remote servers. The client classes of an application, outside the "ClassPath," must be loaded by a specifically programmed class loader. This characteristic is used particularly for loading Java applications via authorized Java browsers. Thus, applications coming from different sources are loaded by different class loaders. For each locator, commonly called a URL (Uniform Resource Locator), a specific instance of a class "application class loader" is used. The external name of a class is the assembly <Name Of Package>+<Name of Class>. When a class is loaded, it is stored in an internal class table, and a reference related to the class loader used to load this class is added into a prefix of the name of the package of the class. The name of the class is therefore <<Reference of Class Loader>+<Name of Package>+<Name Of Class>>. Thus, classes declared as belonging to the same package but loaded by different class loaders are not perceived by the virtual machine as belonging to the same package.

During the resolution of a reference, the usual policy of class loaders is to first search in the system classes, and in case of failure, to search through the class files present at the location where the loader can load the classes. According to this operating principle of the loader, an application cannot directly access the client classes of another application loaded by a different class loader. An application can access all the public resources of the public classes of the ClassPath, but the classes of the ClassPath cannot directly access the classes of an application, although they can refer to instances of client classes of the application by converting them into a public type defined in the ClassPath. An application cannot extend or modify packages of system classes of the ClassPath or of any other applications loaded by different class loaders. Using name space separation by inserting a reference of the class loader into the name of the class, in addition to the complete typing provided by the Java language, makes it possible to provide an effective firewall between the applications. The innate name space separation mechanism makes it easy to load new applications. The applications can exchange objects by interjecting classes specifically programmed for this purpose and located in the "ClassPath." An application can use an object coming from another application loaded by a different class loader if this object can be changed into a public type defined in the "ClassPath."

Unfortunately, this name separation mechanism, based on a conventional virtual machine and its dynamic linking process, cannot be implemented in a specific platform. The dynamic linking cannot performed by the virtual machine of a specific platform, since it requires a memory space that allows the storage of a class file of a conventional Java platform having unresolved references. In a specific platform, the system classes of the APIs and the client classes of the applications are not isolated in particular naming spaces.

SUMMARY OF THE INVENTION

The object of the present invention is to offer a solution that provides the advantages of name separation in the context of embedded systems having a two-part virtual machine, the static linking schema being implemented by the off-platform part.

In the context of multi-application embedded systems, such as for example payment terminals, it is necessary to have high-performance firewalls between Java applications furnished by different sources, such as different payment systems (Visa, MasterCard, etc.). It can be useful to allow flexible cooperation between applications coming from different sources. The embedded system should also be easy to update by downloading new applications or new utility modules, or upgrades, without disturbing the applications already loaded.

A first object of the invention is to offer a loading method that makes it possible to obtain robust firewalls between the applications, while allowing cooperation between the applications and making it possible to upgrade the applications or to load other applications.

This object is achieved through the fact that the method for loading applications into an embedded system according to the invention, comprising a runtime environment including a virtual machine comprising an intermediate pseudocode language interpreter and application programming interfaces (API), from a station on which the source code of the application is written, compiled into pseudocode by a compiler, verified by a verifier, converted by a converter and loaded by a loader, is characterized in that:

the conversion comprises the performance of the static linking of a plurality of sets of packages to be stored in the same name space in the embedded system, called modules, by assigning an identifier to each module (MID), and a reference number to each class, each method and each attribute encapsulated in the classes of the module, the reference to a method or an attribute in the linked pseudocode of a module, being coded in three bytes constituted by an indicator indicating the reference to a class internal or external to the module, the number of the class, and either the number of the method or the number of the attribute, the modules loaded are one or more application program interface modules, called API modules, comprising system classes or service modules, each corresponding to an application, a reference to an external class being systematically interpreted by the virtual machine as a reference to an application program interface module.

According to another characteristic, the loading of the modules into the embedded system comprises the storage of at least one array representing the modules, the number between 0 and n associated by the linker with a module constituting the index of said module in the array, and a table storing the association of the index in the array representing the identifier (MID) of said module, said array and the table being in programmable nonvolatile memory, an external reference to an external module in the pseudocode being interpreted by the interpreter of the virtual machine as constituting an index for access to the module equivalent to the one in the module array.

According to another characteristic, the loading comprises the storage, for each module, of an array representing its classes, comprising a reference to the index of its module and, for each class, an array representing attributes and methods.

According to another characteristic, the modules are referenced in a single module array, the system classes are contained in a single API module, and any reference to an external class in the pseudocode different from n will be interpreted by the virtual machine as a reference to said API module.

According to another characteristic, the classes being declared public, or in private packages, the attributes and methods being declared protected, in private packages or in private classes, the numbering of the classes is done in order of the public classes followed by the classes in private packages; the numbering of the attributes or methods is done by the converter in order of the attributes or methods that are public, protected, in private packages, and in private classes.

According to another characteristic, the system classes are contained in several API modules that can be loaded separately, the loader maintains in the programmable nonvolatile memory two arrays representing modules and two corresponding MID/IMi association tables, one for the API modules and the other for the non-API modules, the loader loading the modules into one of the two arrays based on the nature of the module specified in its header, any external reference of a module of the module array being interpreted as a reference to the index of the API module.

According to another characteristic, the static linking of a module is performed in such a way that the reference to a class external to a non-API module in the intermediate pseudocode is an index in an array of the header of the module, wherein each entry is an identifier (MID) of a referenced API module, the loading of said module into the target platform comprising the replacement of said reference with the number of the index of the API module obtained from the identifier (MID) in the MID/IMi association table of the API modules.

Another object of the invention is to offer a corresponding embedded system.

This object is achieved through the fact that the embedded system according to the invention, comprising a virtual machine and an API platform including application program interfaces, a fixed nonvolatile memory, a programmable or modifiable nonvolatile memory, and a random access memory, is characterized in that the programmable nonvolatile memory comprises at least one API module comprising system classes and service modules, at least one array representing modules, in which the modules are indexed, and a table associating the index of a module in the representing array with the identifier of said module, each module comprising an array representing classes, in which the classes are indexed and in which each class has a reference to the index of its module, each class comprising an array representing attributes and methods, in which the attributes and methods are indexed, the reference to a method or an attribute being coded in at least three bytes corresponding to a reference to a class internal or external to the module, a reference external to the module constituting the index of the API module in the module array, a class number corresponding to the index of the class in the table representing the classes of the module, and a method or attribute number corresponding to the index or the method or the attribute in the array representing the methods or attributes of the class of the module.

According to another characteristic, the embedded system includes means for comparing the first byte of the three bytes encoding a reference to a method or an attribute to a given value n in order to decide whether it is an internal or an external class.

According to another characteristic, the embedded system comprises a main module comprising the main program of the system.

According to another characteristic, the classes are indexed in order of the public classes, followed by the classes in private packages, and the attributes and methods are indexed in order of the attributes or methods that are public, protected, in private packages, and in private classes.

According to another characteristic, the programmable nonvolatile memory comprises several API modules comprising system classes, two arrays representing modules, one for the API modules and the other for the non-API modules and the main module, and two MID/IMi association tables, each corresponding to an array representing modules.

According to another characteristic, the embedded system comprises an access manager class "Access Manager" of an API module comprising a method that makes it possible to create an instance of a service module, via the main module, said class having a protection that prohibits it from having more than one instance.

Another object of the invention is to offer a method for executing an application present in a multi-application embedded system.

This object is achieved through the fact that the method for executing an application of a multi-application embedded system, comprising a runtime environment including a virtual machine comprising an intermediate pseudocode language interpreter and application programming interfaces (API), is characterized in that during the execution of the intermediate pseudocode of a service module, corresponding to an application, referenced in a module array, the reference to a method or an attribute in the pseudocode, coded in at least three bytes corresponding to a reference to a class internal or external to the module, a class number and a method or attribute number, a reference external to the module is interpreted by the virtual machine as a reference to the index of an API module in the array of the API module or modules.

According to another characteristic, upon reception of a request for execution of a service module having an identifier, the runtime environment accesses the input class of a main module comprising the main program of the system, the main module installs an instance of a special class "Access Manager" of an API module that controls access to a service module and uses a method of this class for creating an instance of the input class of the requested service module, by means of a table associating the identifier with the index of the module in an array in which the module is referenced, the instance being returned by the method to the main program.

BRIEF DESCRIPTION OF THE DRAWINGS

Other characteristics and advantages of the present invention will emerge more clearly with the reading of the description below, written in reference to the attached drawings in which.

DESCRIPTION OF THE PREFERRED EMBODIMENTS

Figure 1:
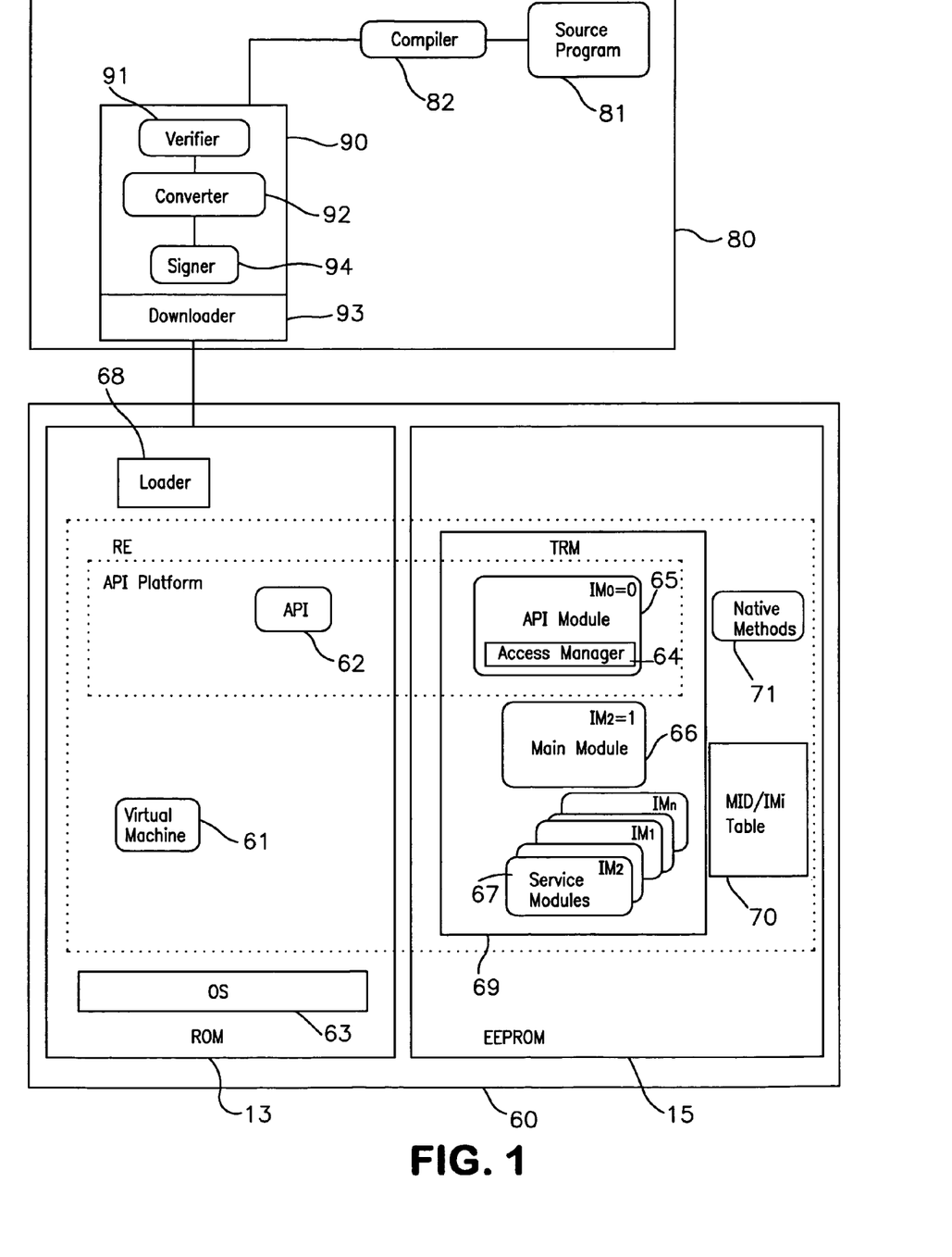
FIG. 1 schematically represents the various elements required for loading a portable object according to a first embodiment.

The method will be described in connection with FIGS. 1 through 3, in a non-limiting way, in the case of the implementation of the invention in an embedded system, for example of the specific type constituted by a smart card or a similar portable object. The designation byte code or byte code program covers any intermediate pseudocode or program.

The portable object constitutes, for example, a smart card and has a structure similar to the one described above in reference to FIGS. 4a and 4b, and specifically comprises a RAM, ROM and EEPROM. The specific platform (60) and a conventional station (80) have, in ROM, a runtime environment (RE) comprising APIs (62) and an "on-platform" virtual machine (61). The specific platform (60) is represented in FIG. 1 as comprising the set of memories ROM and EEPROM. It should be noted that the specific platform (60) more specifically designates the runtime environment (RE) and the elements present in EEPROM. The portable object has, in ROM, an operating system (63). The APIs (62) present in ROM constitute the basic APIs of the API platform, loaded with the on-platform virtual machine for running the latter.

The part (90) of the virtual machine outside the portable object comprises an intermediate pseudocode verifier (91), a converter (92) and possibly a signer (94). The signer delivers a signature for validating the passage through the verifier and the converter. This signature will be verified by the portable object at the time of loading. The loading into EEPROM of applications or new APIs for complementing the basic APIs is done by a loader, which can be composed of two parts, a part outside the portable object that can be installed in the virtual machine outside the portable object (90), called a downloader (93), and a part in the specific platform, called a loader (68).

In a first embodiment, the specific platform (60) comprises two special modules, an API module (65) and a main module (66). The other modules are called service modules (67). Each module corresponds to a set of packages that will be stored in the same name space. The API platform designates the basic APIs (62) and all of the system classes that define the API module (65) or the module of the API platform. The main module comprises the main class defining the main program. Each module, except for the API module (65), has one particular class called "Entry Class," which constitutes the point of access to the module. For the main module, this "Entry Class" is the main class (CP), the one that contains a static method called "main." For the service modules, it is a class with only one constructor, without parameters and implementing a special public so-called "service" interface defined in the API platform. The loading of an application corresponds to the loading of a service module. Each module receives a specific identifier. Such an identifier, which is called MID, can for example be a number, a character string, or an array. For the sake of example, the identifier is a character string.

When they are loaded into the platform by downloading mechanisms distinct from the virtual machine of the specific platform, the modules receive a number between 0 and n. Thus, based on this convention, n+1 modules at most can be present in the specific platform. During the loading of new service modules, the module downloader (93), along with the loader (68), maintains an array (TRM) (69) representing the modules. The number associated with a module is the index (IM) of this module in the array. The loader (68) also maintains a table (70) associating the index (IM) with the identifier (MID) of each module. The API module systematically receives, for the index $IM_0$, the number 0, and the main module receives for the index $IM_1$ the number 1. The header of each module includes an indicator that allows the loader to determine the nature of the module—"main," "service," or "API" module.

The loader (68) can only load modules that are authorized to reside in the portable object, i.e., only modules having a signature recognized by the portable object. The loader (68) therefore includes means for verifying the signature of a received module, for comparing it to the signature recognized by the portable object, and in case of a negative comparison, for prohibiting the loading.

Conventionally, as defined in the prior art mentioned above, the source program (81) of an application is written, then compiled by a compiler (82), and then verified by the verifier (91).

The static linking, performed in the converter (92) by a component of the converter called a linker, will resolve the symbolic references by assigning a number (NCI) to each class of a module, a number (NM) for each method in a class, and a number (NA) for each attribute in a class.

Each of these numbers (NCI, NM, NA) is between 0 and n, and can thus be represented by a byte. For example, each of these numbers is between 0 and 255 (n=255). The reference to a method or an attribute of a class will thus be coded into the linked pseudocode of the methods of the module in two bytes. The pseudocode will contain these two bytes, <NCI> for the class, and <NA> for an attribute or <NM> for a method.

Figure 3:
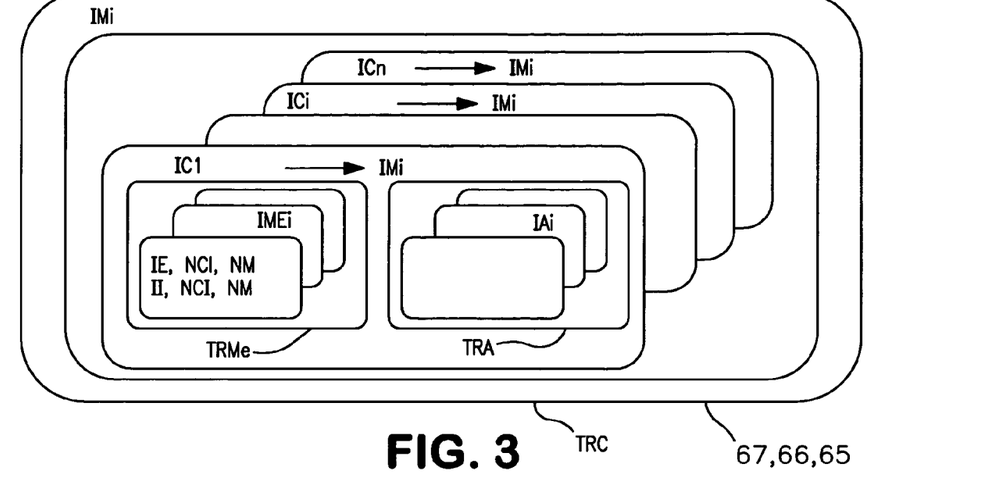
FIG. 3 represents the internal representation of a module.

According to FIG. 3, the internal representation of an API module (65), a main module (66), or a service module (67) will contain an array (TRC) representing classes; the number (NCI) associated by the linker outside the embedded system with each class is the index (ICi) of the representation of this class in the array (TRC). Each class also has a reference to the index IMi of its module. Likewise, the representation of each class contains an array representing the methods (TRMe) and an array representing the attributes (TRA) belonging to the class. The number (NM) associated by the linker outside the embedded system with each method is the index IMi of the representation of this method in the array (TRMe), and the number (NA) associated by the linker outside the embedded system with each attribute is the index (IAi) of the representation of this attribute in the array (TRA).

For example, we want a module to be able to refer only to its own classes and to the system classes of the API platform, the system classes corresponding to the classes of the "ClassPath" of a conventional platform. According to the invention, in order to make it possible to distinguish between a reference to a class internal to the module and the reference to a system class (or class external to the module), an internal (II) or external (IE) indicator is added to the reference to a method or an attribute. The resolved reference is then coded in three bytes: <IE/II><NCI><NM> or <IE/II><NCI><NA>.

In accordance with an established convention, for the value n of the first byte <IE/II>, the value 255 in our example, corresponds to a reference <II> internal to the module, and any other value for the first byte corresponds to a reference <IE> external to the module.

The linker of the converter (92) of the virtual machine outside the portable object (90), first links the API module (65), which does not have any external references <IE> in its pseudocode, and produces a layout or arrangement corresponding to a scheme of symbolic names of its classes and their methods and attributes. During the linking of the other modules, this layout will be used to establish the external references to system classes of the API module (65).

Based on our convention for the bytes encoding the references, there can be at most 256 (n+1) classes in the API module and 256 classes in each additional module.

During the execution of a service module, when the virtual machine (61) finds a reference to a method <NM> or an attribute <NA> in the pseudocode, knowing the class <NCI> in which this reference is found, it can directly retrieve the index <IMi> of the module in question, the latter corresponding to the external (IE) or internal (II) reference. Any external reference <IE> in the pseudocode of a service module will be systematically interpreted by the virtual machine as a reference to the API module. A service module or the main module cannot refer to the classes of any other module except those of the API module. The system classes of this API module cannot refer to the classes of a service module or the main module. The internal reference to a class of a module, corresponding to the value n for the first byte, does not require any knowledge a priori of the name space that will be assigned to the module. The fact that no fixed name space is defined a priori during the conversion phase makes it possible to accelerate the resolution of the references and to determine the naming space of a module during the loading, after the conversion phase. The virtual machine, during the interpretation of a reference to an attribute or a method in the pseudocode, uses the three cascaded indexes <IE/II><NCI><NM> or <IE/II><NCI><NA>. The memory space of the module being determined, the index <NCI> determines the desired entry into the array (TRM) of the classes of the module, then the last index <NM> or <NA> gives the desired entry into the method array (TRMe) or the attribute array (TRA).

The API module comprises a special class (64), called class "Access Manager", which comprises a native method (getServiceInstance) whose role is to return an object that is an instance of the input class of the requested service module, from the identifier (MID) of the module. This method uses the MID/IMi association table (70) to find the index of the requested module in the module array (69), then creates an instance of the input class of this module, an instance that is returned by the method. According to the invention, the class "Access Manager" (64) is protected by construction by a method that consists of prohibiting this class from having more than one instance. This method (getServiceInstance) belongs to the main program contained in the main module. The main module, which is activated first when the portable object is used, creates one and only one instance of the class "Access Manager", which allows it to use the method getServiceInstance, but bars any other service from creating another instance for using this method.

In operation, just like in a conventional platform, the runtime environment (RE) accesses the input class (EC) of the main module and activates its input method (main). The main module, being the first one activated, installs an instance of the class "Access Manager" before any other service does so, since in order to activate other services, the main module must already have such an instance of the access class.

This simple device makes it possible to reproduce the protective effect linked to the concept of a naming space in a conventional platform. The simple fact that a service module is loaded into the module array, and that the presence in the pseudocode of any external references is interpreted by the virtual machine as a reference to the API module, renders this module completely inaccessible directly by the other modules, thus creating a total firewall.

This first embodiment makes it possible to obtain the advantages of a firewall produced by name space separation in the context of a two-part virtual machine. However, this embodiment is not very flexible, and has two drawbacks.

First, it prevents any modification or extension of the system classes with modules that are already pre-linked. A conventional Java architecture makes it possible to modify and extend the classes of the API platform without having an impact on the already compiled classes of additional modules. But in the embodiment described above, any modification of the system classes, although invisible for alien modules, would modify the layout of the API platform and would make it necessary to modify the pre-linked pseudocode of each module already linked with a prior version of the layout, and consequently the interpreter.

Secondly, the pre-linked modules are assumed to be portable between the various embedded platforms or terminals, which requires each of these platforms to have the same layout as the API platform, thus prohibiting the utilization of any proprietary extension.

In order to partially remedy these drawbacks, a variant of the first embodiment consists of requiring that, in the numbering of the layout, the public classes come first, before the classes in private packets. In addition, the public methods or public attributes come before those that are protected and those that are in private packages and in private classes. This makes it possible to freely add new public classes into the API module (API).

Figure 2:
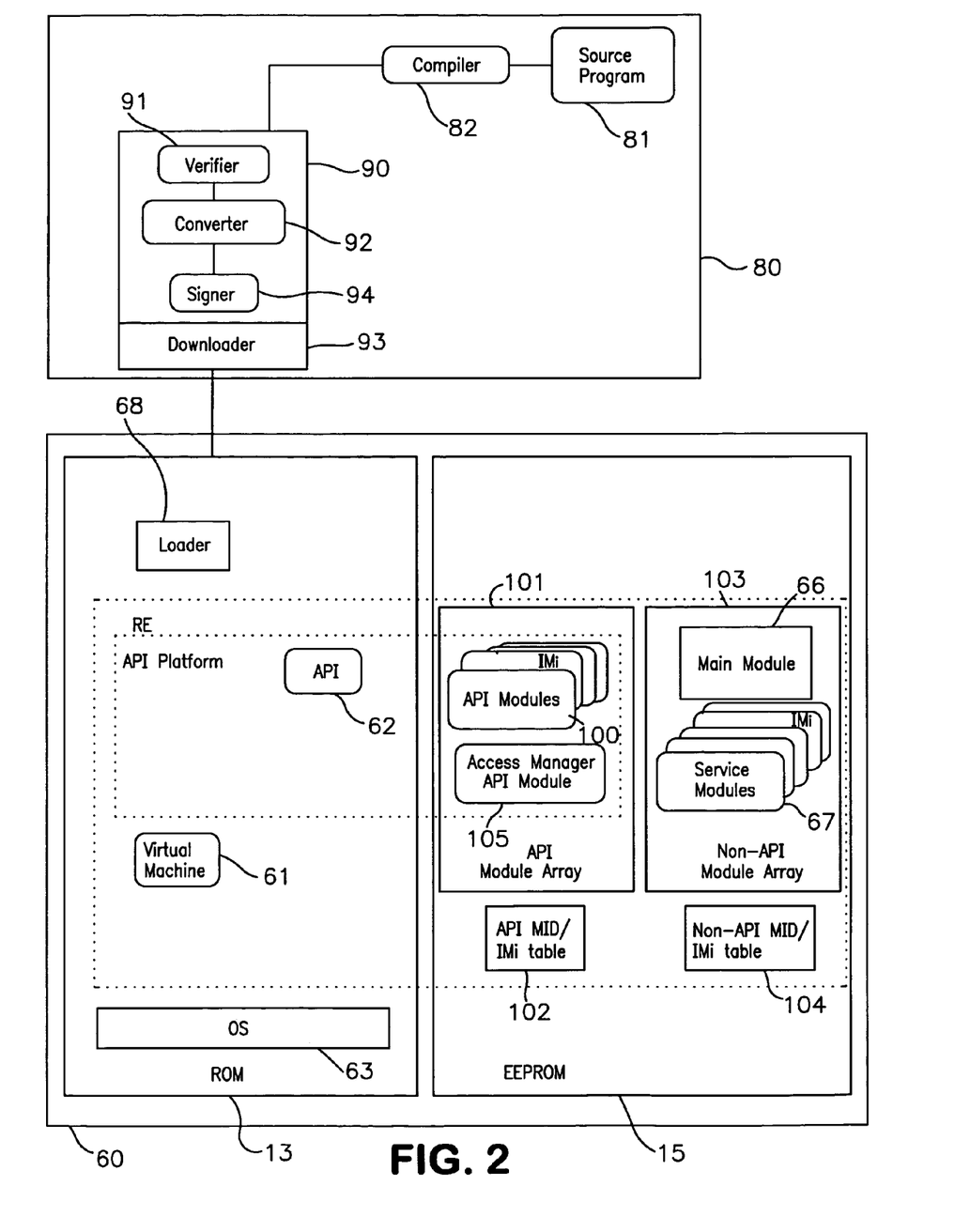
FIG. 2 schematically represents the various elements required for loading a portable object according to a second embodiment.

FIG. 2 represents a second embodiment that allows upgrading of the API platform. The API platform is constituted by several API modules (100) that can be loaded separately, instead of being constituted by a single API module.

In this embodiment, the downloader (93) and the virtual machine share two module arrays and two MID/index association tables instead of one of each, an array (101) and an association table (102) for the API modules and an array (103) and an association table (104) for the non-API modules corresponding to the service module (67) and the main module (66).

Each module has in its header an indicator indicating its nature, "Service" or "API", which allows the loader to load the module into the API module array (101) or into the non-API module array (103). This indicator is placed in the header of the module during the compilation phase by the converter.

The firewall constituted by the separation of the name space is present only between the non-API modules. Any external reference to a service module will be interpreted by the interpreter of the on-platform virtual machine as an index of the API module array.

The non-API modules are numbered from 0 to 255 at most, in the example in which n=255. For example, 0 is the index of the main module (66). The API modules (100) are numbered from 0 to 254 at most, 0 being for example the index of a so-called primary API module, which contains all of the native methods. According to the convention described above, this allows at most 255 (n) different modules in the API platform. The reference to a method or attribute in the pseudocode is:

<<IE/II><NCI><NM/NA>>

The value 255 (n) for the first byte indicates, as in the first embodiment, a reference internal to the module. Each value different from 255 indicates a reference external to a specific module (100) of the API module array of the API platform.

After the performance of the linking by the off-platform linker (92), the pseudocode of a module includes a header having an array of referenced modules used to link the current module. This referenced module array comprises at most 255 entries, each entry corresponding to the identifier (MID) of an API module (100). The first byte of an external reference in the pseudocode will therefore be an index in this array. When a non-API module (67, 66) is loaded into the platform, the index numbers associated with API modules (100) are known, and thus each first byte of an external reference is replaced by the index number associated with the referenced API module using the MID/IMi association table (102) of the API modules (100). This replacement is the only linking operation performed in the specific platform by the loader (68), the MID/IMi association table (102) being used only for performing this linking operation.

For the sake of example, let's assume that in the pseudocode of a service module "TEST", we have the reference to a method number 5 of class number 7 of an API module whose identifier (MID) is "F00". Let's also assume that "F00" is the identifier of the fourth external API module found referenced in the service module "TEST". The reference in the pseudocode is therefore constituted by the following three values: 3, 7, 5.

The number 3 corresponds to the fourth index in the array of referenced modules present in the header of the module, which comes at the beginning of the pseudocode, the value of this entry being the identifier (MID) "F00". Let's assume that at the time the API module "F00" is loaded, the internal index 34 has been assigned to it in the target platform, in the association table (102) of the API modules. Therefore, the loader (68), using the association table (102), modifies the reference in the pseudocode of the service module "TEST" so that it becomes: 34, 7, 5.

During the execution of the pseudocode of a module, a reference external to the module is systematically interpreted by the virtual machine as an entry in the API module array. The modules of the non-API module array remain invisible to one another as well as to the other API modules. This simple device makes it possible to reproduce the protective effect linked to the concept of a naming space in a conventional platform. The simple fact that a module is loaded into the non-API module array makes it completely inaccessible directly by the other modules, thus creating a total firewall.

The API module array (101) comprises a specific module (105), called an "API Access" module, which comprises a native method (getServiceInstance) in a class "Access Manager" whose role is to return an object that is an instance of the input class of the requested service module. This method uses the MID/IMi association table (104) to find the index of the requested service module in the non-API module array (103), then creates an instance of the input class of this module, which is returned by the method to the main program. The recommended security policy is to make the class "Access Manager" a protected class whose constructor and methods are declared protected. In addition, the "API Access" module (105) includes a protection consisting of prohibiting the class "Access Manager" from having more than one instance. This method is reserved for the main program contained in the main module (66). The main module, which is activated first, creates an instance of the module Access Manager, which allows it to use the method getServiceInstance, but prohibits any other service from creating another instance for using this method. Thus, the main module can create service instances.

Several methods can be used to obtain this protection, which consists of prohibiting the class "Access Manager" from having more than one instance. The constructor of the class "Access Manager" can, for example, inhibit the request for creating an instance when one already exists and trigger a security exception. In operation, the runtime environment (RE) accesses the input class of the main module (66) and activates its input method (main). The main module, being the first one activated, installs an instance of the class "Access Manager" of the Access module before any other service does so.

In order to allow a service module to activate another service module, this strict security policy can be modified by adding to the class "Access Manager" of the API Access module (105) public classes that will allow any module to send requests to it. These requests will be processed and controlled by the sole instance created by the main module. These public classes specifically include a static method that makes it possible to obtain the sole instance. A module having access to the object that is the instance of the class "Access Manager" can activate another service module and use it, but it cannot directly reference its classes, its methods or its attributes without being referred by the virtual machine, given that any external reference in the pseudocode is a reference internal to the module or a reference external to an API module.

For a simple embodiment of this solution, it is necessary not to have circular references among the API modules. Consequently, the transitive closure of the relation "refers to" must be a strict partial order on a set of modules. It is thus possible to design, in the linker of the converter (92), a simple strategy for linking and producing the layout of the API modules by first processing the minimum elements not yet linked. It is possible to use the same strategy based on a partial order for downloading the API modules, so that when a module M is downloaded, all of the modules to which it refers have already been downloaded, and a number has been assigned to them. The assignment of the internal index in the target platform is done by the module loader (68) by assigning the index n−1 to the API of order n. An API module cannot refer to another API module with a higher index.

The utilization of this system of dual module arrays (101, 103) and association tables (102, 104) makes it easy to replace a single API module with several API modules that can be loaded separately. The replacement of a single API module with several API modules makes it possible to extend the API platform with new modules, without modifying the linking of the modules already loaded, and without changing the security provided by the firewalls. Of course, these two embodiments are not compatible; the modules must be pre-linked specifically for one embodiment or the other, the pseudocode related to one of the embodiments not being portable to a platform implementing the other embodiment. Moreover, the interpreter of the virtual machine differs form one embodiment to the other. In the first embodiment, the virtual machine manipulates only one array and one association table; the first byte of a reference is interpreted by the virtual machine as an internal reference for any value equal to n, and as an external reference to the sole API module for any value different from n. In the second embodiment, the virtual machine manipulates two arrays and two association tables: the first byte of a reference in the pseudocode is interpreted by the virtual machine as a reference internal to the module for any value equal to n, and any value different from n will be taken directly as an index in the API module array. In both embodiments, the interpreter of the virtual machine comprises means for comparing the first byte of the three coding bytes of a reference to a method or an attribute with a given value n in order to decide whether it refers to a class that is internal or external to the module. The numbering of the API modules can be determined at the time of loading, in order to permanently set the external references in the pseudocode in a very simple way.

The same mechanisms are used to handle both types of modules, although the way in which they are used and the security obtained are entirely different. Any module can freely access the API modules, since their classes are system classes. The utilization of the modular approach is used with the service modules to obtain a strong firewall for protecting these modules from any direct access.

The method according to the invention can be implemented in any type of portable object having limited resources, such as for example 16 Kb of ROM, 8 Kb of EEPROM and 256 k of RAM.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

What is claimed is:

1. A method for loading applications into modules of an embedded system having a runtime environment including a virtual machine comprising an intermediate pseudocode language interpreter and application programming interfaces (API), from a station on which a source code of the application is written, compiled into pseudocode by a compiler, verified by a verifier, converted by a converter and loaded by a loader comprising:

assigning an identifier to each module, and a reference number to each class, each method and each attribute encapsulated in classes of a module, so as to statically link a plurality of sets of packages to be stored in the same name space in the embedded system to effect conversion by the converter;

coding the reference to a method or an attribute in the linked pseudocode of a module in three bytes constituted by an indicator indicating the reference to a class internal or external to the module, the number of the class, and either the number of the method or the number of the attribute, and loading one or more application program interface modules comprising system classes or service modules, each corresponding to an application, a reference to an external class being systematically interpreted by the virtual machine as a reference to an application program interface module.

2. A method for loading applications into the embedded system according to claim 1, wherein the loading of the modules into the embedded system comprises storing of at least one module array representing the modules, the number between 0 and n associated by the linker with a module constituting the index of said module in the array, storing the association of the index in the array representing the identifier of said module in a table, said array and the table being in programmable nonvolatile memory, an external reference/ to an external module in the pseudocode interpreted as constituting an index for access to the module equivalent to the one in the module array.

3. A method for loading applications into the embedded system according to claim 2, wherein the loading of the modules comprises the storage, for each module, of an array representing its classes, comprising a reference to the index of its module and, for each class, an array representing attributes and methods.

4. A method for loading applications into the embedded system according to claim 2, wherein the modules are referenced in a single module array, and the system classes different from n will be interpreted by the virtual machine as a reference to said API module.

5. A method for loading applications into the embedded system according to claim 4, wherein the classes are declared public, or in private packages, the attributes and methods are declared protected, in private packages or in private classes, the numbering of the classes is done in order of the public classes followed by the classes in private packages; the numbering of the attributes or methods is done by the converter in order of the attributes or methods that are public, protected in private packages, and in private classes.

6. A method for loading applications into the embedded system according to claim 2, further comprising containing system classes contained in several API modules that can be loaded separately, maintaining in the programmable nonvolatile memory two arrays representing modules and two corresponding MID/IMi association tables, one for the API modules and the other for the non-API modules, and loading the modules into one of the two arrays based on the nature of the module specified in a header, any external reference of a module of the module array being interpreted as a reference to the index of the API module.

7. A method for loading applications into the embedded system according to claim 6, wherein static linking of a module is performed such that the reference to a class external to a non-API module in the intermediate pseudocode is an index in an array of the header of the module, wherein each entry is an identifier (MID) of a referenced API module, the loading of said module into the target platform comprising the replacement of said reference with the number of the index of the API module obtained from the identifier (MID) in the MID/IMi association tables of the API modules.

8. An embedded system comprising a virtual machine and an API platform including application program interfaces, a fixed nonvolatile memory, a programmable nonvolatile memory, and a random access memory, the programmable nonvolatile memory comprising at least one API module comprising system classes and service modules, at least one array representing modules, in which the modules are indexed, and a table associating an index of a module in the representing array with an identifier of said module, each module comprising an array for representing classes, in which the classes are indexed and in which each class has a reference to the index of its module, each class comprising an array for representing attributes and methods (TRMe), in which the attributes and methods are indexed, the reference to a method or an attribute being coded in at least three bytes corresponding to a reference to a class internal or external to the module, a reference external to the module constituting the index of the API module in the module array, a class number corresponding to the index of the class in the table representing the classes of the module, and a method or attribute number corresponding to the index or the method or the attribute in the array representing the methods or attributes of the class of the module.

9. The embedded system according to claim 8, further comprising means for comparing the first byte of the three bytes to a given value n in order to decide whether it is an internal or an external class.

10. The embedded system according to claim 8, wherein a main module comprises the main program of the system.

11. The embedded system according to claim 8, wherein the classes are indexed in order of the public classes followed by the classes in private packages, and the attributes and methods are indexed in the order of the attributes or methods that are public, protected, in private packages, and in private classes.

12. The embedded system according to claim 11, characterized in that the programmable nonvolatile memory comprises several API modules comprising system classes, two arrays representing modules, one for the API modules and the other for the non-API modules and the main module, and two MID/IMi association tables, each corresponding to an array representing modules.

13. The embedded system according to claim 10, further comprising an access manager class "Access Manager" of an API module comprising a method for creating an instance of a service module, via the main module, said class having a protection that prohibits it from having more than one instance.

14. A method for executing an application of a multi-application embedded system having a runtime environment including a virtual machine comprising an intermediate pseudocode language interpreter and application programming interfaces (API), wherein during the execution of the intermediate pseudocode of a service module, corresponding to an application, referenced in a module array, the reference to a method or an attribute in the pseudocode, coded in at least three bytes corresponding to a reference to a class internal or external to the module, a class number and a method or attribute number, a reference external to the module is interpreted by the virtual machine as a reference to the index of an API module in the array of the API module or modules.

15. The method for executing an application of a multi-application embedded system according to claim 14, wherein upon reception of a request for execution of a service module having an identifier, the runtime environment accesses the input class of a main module comprising the main program of the system, the main module installs an instance of a special class "Access Manager" of an API module that controls access to a service module and uses a method of this class for creating an instance of the input class of the requested service module, by means of a table associating the identifier with the index of the module in an array in which the module is referenced, the instance being returned by the method to the main program.

* * * * *